United States Patent [19]

Hayashi et al.

[11] Patent Number: 5,824,407
[45] Date of Patent: Oct. 20, 1998

[54] FOAM MOLDED ARTICLE WITH INTEGRAL SKIN HAVING AN ANTIBACTERIAL EFFECT

[75] Inventors: Itsuki Hayashi; Yoshio Ushida, both of Inazawa; Sadao Uchida, Ichinomiya, all of Japan

[73] Assignee: Toyoda Gosei Co., Ltd., Aichi-ken, Japan

[21] Appl. No.: 687,980

[22] Filed: Jul. 29, 1996

[30] Foreign Application Priority Data

Jul. 28, 1995 [JP] Japan .................................. 7-193815

[51] Int. Cl.$^6$ .................................. B32B 5/20; C08J 9/34
[52] U.S. Cl. .................................. 428/318.8; 428/319.3; 428/318.6; 521/51; 523/122
[58] Field of Search .................. 428/318.8, 319.3, 428/318.6; 521/51; 523/122

[56] References Cited

U.S. PATENT DOCUMENTS

| 4,476,251 | 10/1984 | Cianciolo et al. | 521/110 |
|---|---|---|---|
| 4,937,273 | 6/1990 | Okuyama et al. | 521/119 |
| 5,476,619 | 12/1995 | Nakamura et al. | 264/45.5 |

FOREIGN PATENT DOCUMENTS

| 1 504 544 | 9/1969 | Germany . |
|---|---|---|
| 34 35 091 A1 | 4/1986 | Germany . |
| 44 12 977 A1 | 12/1994 | Germany . |
| 1-48847 | 10/1989 | Japan . |
| 4-345676 | 12/1992 | Japan . |
| 6-71769 | 3/1994 | Japan . |
| 1017670 | 1/1966 | United Kingdom . |

OTHER PUBLICATIONS

Patent Abstract of Japan, M–781, 1989, vol. 13, No. 6 of JP 63–216 733.

*Primary Examiner*—Christopher Raimund
*Attorney, Agent, or Firm*—Cushman Darby & Cushman, IP Group of Pillsbury Madison & Sutro LLP

[57] ABSTRACT

The present invention relates to an integral-skin foam molded article which includes: a main body of the molded article comprising a flexible urethane foam molding material; and a coating layer comprising a polyurethane coating material formed on the surface of the main body of the molded article, either or both of said urethane foam molding material and coating layer containing one or more of an inorganic or organic antibacterial agent. This integral-skin foam molded article can maintain an anti-fungal and anti-bacterial action for a significantly long period of time and therefore does not undergo discoloration.

18 Claims, 3 Drawing Sheets

FOAM MOLDED ARTICLE WITH INTEGRAL SKIN HAVING AN ANTIBACTERIAL EFFECT

BACKGROUND OF THE INVENTION

1. Field of the Invention

The present invention relates to an antibacterial foam molded article comprising a flexible urethane foam molding material as a main body of the molded article and a polyurethane integral skin as a coating layer on a surface of the main body. The term integral-skin foam molded article is generally used to refer to the above.

The integral-skin foam molded article of the present invention is suitable for interior automotive trims which are required to have a soft touch and exhibit wear resistance, such as the trim on a steering wheel, horn pad, armrest, headrest and instrument panel.

2. Description of the Related Art

Recent automobiles exhibit increased airtightness of the interior for the purpose of enhancing the comfortableness thereof, for example, sound insulation and heat insulation, and, furthermore, automobiles are often driven with the windows being closed in all seasons with the widespread use of air conditioners. That is, in many cases, the inside of a car is usually exposed to an atmosphere of high temperature and humidity.

Therefore, fungi and bacteria propagate on the interior trims, such as the steering wheel, after being used for a long time, and thus cause discoloration of the interior trims and problems in appearance.

In order to cope with the problems associated with fungi and bacterial growth on the interior trims, it can be considered to spray antibacterial spraying agents onto interior trim parts, such as the steering wheel, but it is undesirable to carry out the spraying in the car interior which is badly ventilated, and, furthermore, those parts which the hands always contact with experience sliding and undergo wearing action, such as the steering wheel, and are considered to immediately lose the antibacterial effect.

An object of the present invention is therefore to provide integral-skin foam molded articles which can maintain antibacterial action for a long period and are therefore essentially free from discoloration caused by bacteria.

SUMMARY OF THE INVENTION

The above object and others are accomplished by the integral-skin foam molded articles of the present invention which solve the above problems by the following construction.

A first embodiment of the present invention resides in an integral-skin foam molded article including: a main body of the molded article comprising a flexible urethane foam molding material; and a coating layer formed on the surface of the main body of the molded article. A polyurethane coating material which constitutes the coating layer contains one or more of an inorganic or organic antibacterial agent.

A second embodiment of the present invention resides in the above-mentioned molded article wherein the flexible urethane foam molding material which constitutes the main body of the molded article contains one or more of an inorganic or organic antibacterial agent in addition to the coating layer.

A third embodiment of the present invention resides in an integral-skin foam molded article comprising a flexible urethane foam molding material and having substantially no protective coat, wherein the urethane foam molding material contains one or more of an inorganic or organic antibacterial agent.

Other objects, features, and characteristics of the present invention will become apparent upon consideration of the following description in the appended claims with reference to the accompanying drawings, all of which form a part of the specification, and wherein like reference numerals designate corresponding parts in the various figures.

DETAILED DESCRIPTION OF THE INVENTION

The integral-skin foam molded article of the present invention will be explained taking mainly a steering wheel as an example of the molded article, but the present invention is not contemplated as limited to this example.

Parts in the present specification are by weight, unless otherwise notified.

Figure 1:
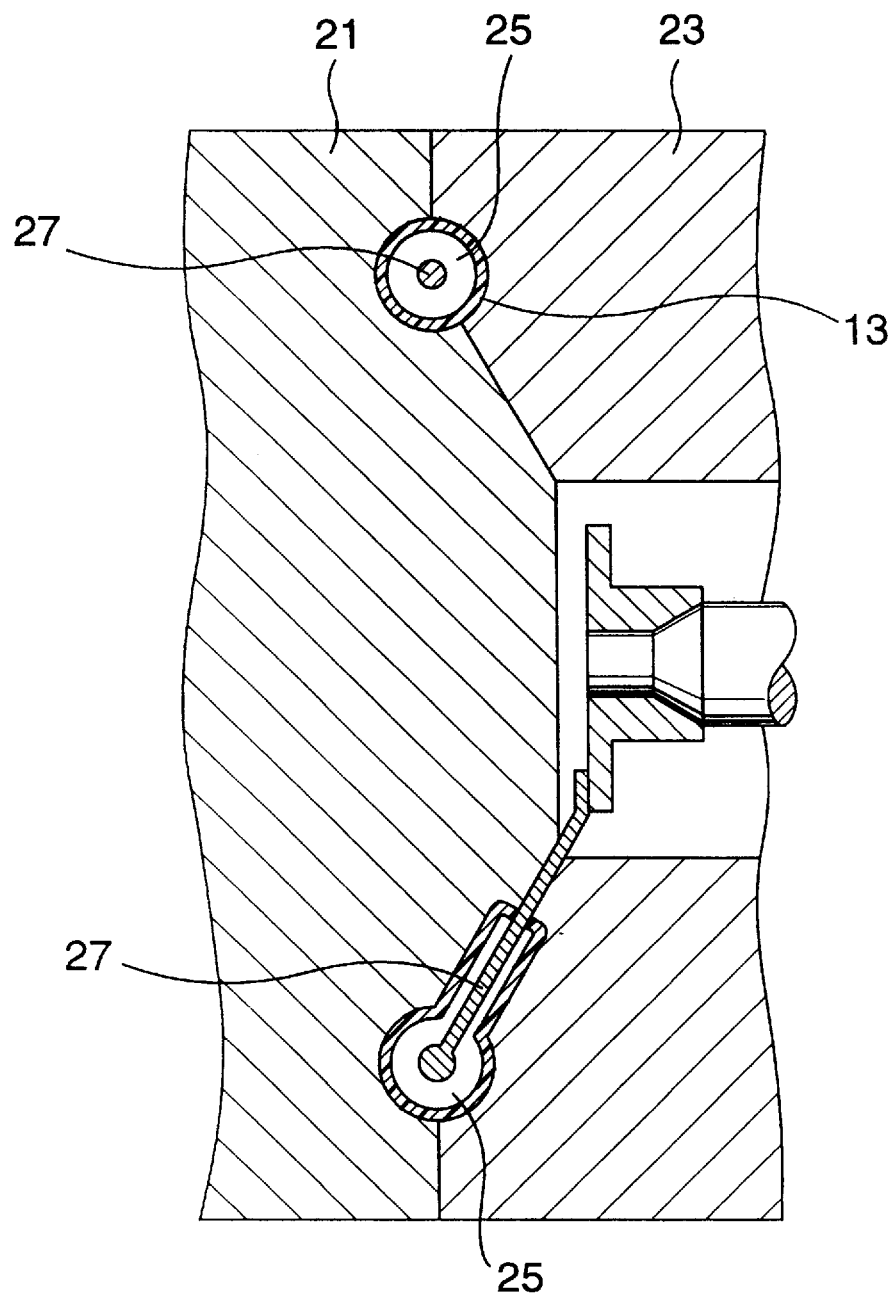
FIG. 1 is a schematic view of a mold suitable or molding a steering wheel as an example of the integral-skin foam molded article of the present invention.
Figure 2:
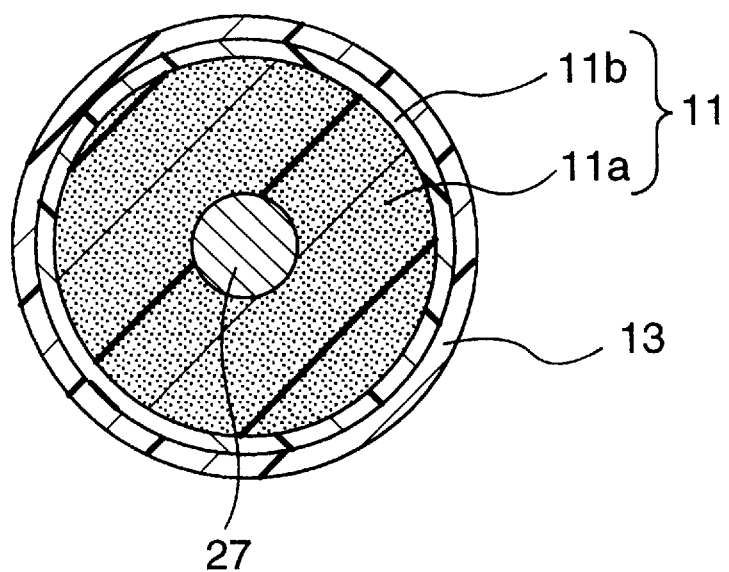
FIG. 2 is a cross-sectional view of an outer ring part of a steering wheel molded as the integral-skin foam molded article of the present invention.

With reference to FIGS. 1 and 2, a first specific embodiment of the present invention resides in an integral-skin foam molded article including a main body 11 (e.g., the coating part of a steering wheel) of the molded article comprising a flexible urethane foam molding material; and a coating layer 13 formed on the outer surface of the main body of the molded article. The coating layer 13 comprising a polyurethane coating material contains one or more of an inorganic or organic antibacterial agent.

It is preferred that the flexible urethane foam molding material of the main body of the molded article also contain one or more of an inorganic or organic antibacterial agent. This is because even when the coating layer 13 is thin and the main body of the molded article becomes exposed due to wearing away of the coating layer, the antibacterial effect can be maintained for a long period by the presence of agents within the underlying flexible urethane foam molding material. Furthermore, when the antibacterial agent has a tendency of readily migrating to the inner side (the side closer the main body 11) or to the outer surface side of the coating layer 13, the presence of agents within the flexible urethane foam molding material maintains the antibacterial effect for a long period by hindering the migration of the antibacterial agent to the inner side of the coating layer or making up for the migration amount of the antibacterial agent to the outer surface of the coating layer.

Suitable examples of the urethane coating material of the coating layer 13 are unlimited, depending on the desired end properties of the coating layer, but the following one-can type or two-pack type urethane resins dispersed in a solvent which are described in JP-A-4-345676, the disclosure of which is hereby incorporated by reference, can be used individually or as a mixture thereof.

As the one-can type urethane resins, there may be used those which comprise, as a resin component, an isocyanate prepolymer obtained by the chain extension of a polyisocyanate with a polyol. Specifically, mention may be made of, for example, "MV-0653" manufactured by Dainippon Ink & Chemicals Inc.

As the two-pack type urethane resins, there may be used those which comprise a polyol component (main component) and a polyisocyanate (including 2 or more isocyanate prepolymers which are obtained by reacting isocyanate with polyol to extend the molecular chain and allowing —NCO groups to exist at the ends of the chain due to excess amount of isocyanate) called a hardener. Specifically, mention may be made of, for example, "RIM BOND" manufactured by Lilly Co., Ltd.

Suitable examples of the flexible urethane foam molding materials of the main body 11 are also unlimited, depending on the desired end properties of the foam molding material, but preferred examples are mixtures of a polyol component and an isocyanate component which contain substantially no foaming agent and which are limited in water content of the polyol component to less than about 0.4% by weight as disclosed in JP-A-6-71769, the disclosure of which is hereby incorporated by reference. These foam molding materials can be use individually or as a mixture thereof. These mixtures can be foam molded in a cavity of a mold which is reduced in pressure and can be foam molded without using a liquid foaming agent such as fluorocarbon, chlorofluorocarbon.

The polyol component of the polyurethane coating material and flexible urethane foam molding material comprises a polyol and, as necessary, one or more of, for example, a crosslinking agent, a catalyst, a pigment, etc. Suitable examples of each of the above ingredients and the amounts, if any, by which they are to be added to the polyol should be apparent to those of ordinary skill in the art according to the particular properties of the molded article desired. When the polyol component comprises a plurality of the above ingredients, it is preferred to preliminarily mix the ingredients with the polyol before use in the coating and molding materials.

Suitable examples of the inorganic antibacterial agents used in the molded article of the present invention include, for example, silver-supporting inorganic materials such as zeolite, apatite, montmorillonite and zirconium phosphate, among others. Suitable examples of the organic antibacterial agents include, for example, benzimidazole antibacterial agents and 10, 10'-oxybisphenoxarsine, among others.

The amount of these antibacterial agents is about 0.1–10 parts, preferably about 0.5–5 parts, for 100 parts of the coating resin content when they are contained in the polyurethane coating materials and is about 0.1–10 parts, preferably about 0.5–5 parts, for 100 parts of the flexible urethane foam molding materials when they are contained in the flexible urethane foam molding materials. If the amount of the antibacterial agents is less than about 0.1 parts, the effect of addition (antibacterial action) cannot be maintained for a long period of time and if the amount is more than about 10 parts, discoloration and deterioration of moldability are apt to occur.

Figure 3:
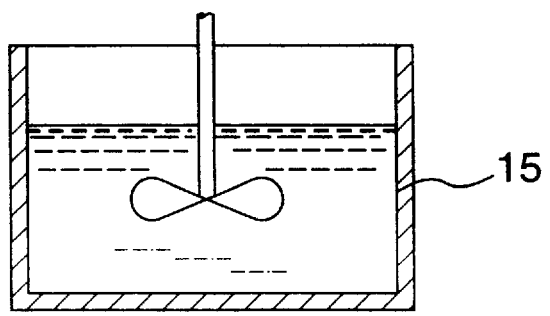
FIG. 3 is a flow diagram which shows the process of incorporation of an antibacterial agent into either or both of the polyurethane coating material and the flexible urethane foam molding material used in the integral-skin foam molded article of the present invention.
Figure 3:
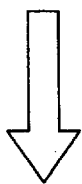
Figure 3:
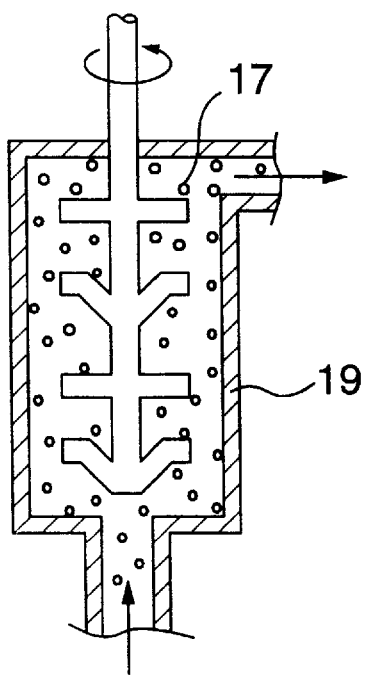

For incorporation of the antibacterial agents into either or both of the polyurethane coating material and the flexible urethane foam molding material, the inorganic antibacterial agents which can maintain the antibacterial action for a long time are difficult to uniformly disperse within the above materials as they are. Therefore, as shown in FIG. 3, one or more of the antibacterial agents can be preferably added to a part of the predetermined amount of the polyurethane coating material or the polyol component to be used (e.g., about 1/20 of the predetermined amount). The resulting mixture with the antibacterial agent is preliminarily agitated in a preliminary agitating tank 15, then, the preliminarily agitated material is transferred to a ball mill 19 packed with glass beads 17 and agitated and dispersed in the ball mill. This material can then be returned to the remainder of the urethane coating material or polyol component, followed by mixing to prepare the polyurethane coating material or the flexible urethane foam molding material used in the molded article of the present invention. Of course, if desired, it is also possible to add the one or more of the antibacterial agents to the total amount of the polyurethane coating material or the polyol component of the flexible urethane foam molding material and preliminarily agitate the resulting mixture, and, then, disperse and agitate the mixture in the ball mill.

With reference to FIGS. 1 and 2, the steering wheel as an example of the molded article of the present invention is produced, for example, in the following manner.

A polyurethane coating material containing one or more of an antibacterial agent according to the foregoing description is coated on the surface of the cavity for product 25 comprising a pair of split molds 21 and 23 to form a mold coat layer (usually, having a thickness of about 2–100 μm, preferably 5–100 μm in view of sustained wear resistance and antibacterial activity) which corresponds to the coating layer 13 of the molded article. Hereinafter, numeral 13 designates the mold coat layer in the molds during production process as well as the coating layer of the molded article obtained by the process. After the mold coat layer is properly dried, the molds 21 and 23 are closed. The cavity 25 for product formed by closing the molds is put in the state of reduced pressure (usually not higher than about 50 Torr) using a pressure reducing device (not shown), urethane foam molding material containing one or more of an antibacterial agent according to the foregoing description is introduced into the cavity for product 25 by injection (usually, by reaction injection molding which is hereinafter referred to as "RIM").

As the flexible urethane molding material foams and hardens, a main body 11 (comprising a core layer 11a of low density and a skin layer 11b of high density) of the integral-skin foam molded article is formed and, simultaneously, the mold coat layer 13 is allowed to contact the main body 11 of the molded article and core bar 27 and is integrated with them to form a coating layer of the molded article. After completion of the foaming and hardening, the molds 21 and 23 are opened and the molded article (a steering wheel) is released. In this case, the concentration of the antibacterial agent ($g/cm^2$: amount per volume) in the skin layer 11b is higher than that in the core layer 11a. This is because the density of the skin layer 11b is higher than that of the core layer 11a.

In the above, an explanation is given taking, as an example, a steering wheel which is an integral-skin foam molded article having a coating layer. However, in the case of, for example, a headrest which does not contact with one's hands as often as the steering wheel, a protective coat like the coating layer does not necessarily need to be formed, and, therefore, it is essential that the flexible urethane foam molding material contains one or more of the inorganic or organic antibacterial agents. In either case, since the density of the skin layer 11b is higher than that of the core layer 11a, the concentration of the antibacterial agent in the main body 11 is higher on the outer surface layer side thereof.

The integral-skin foam molded article of the present invention exhibits an antibacterial effect for a significantly long period, since at least the coating layer contains one or more of an inorganic or organic antibacterial agent when it has the coating layer and since the flexible urethane foam molding material contains one or more of the inorganic or organic antibacterial agent when it has no coating layer. Accordingly, the molded articles of the present invention are advantageous because there is significantly retarded discoloration of the molded articles caused by bacteria or fungi growth. Furthermore, since the concentration of antibacterial agent on the surface layer side of the molded articles is higher, with or without the presence of a coating layer, the antibacterial effect is exhibited with a significantly small addition amount of the agent.

A steering wheel example of the integral-skin foam molded article of the present invention will be explained in more detail by the following Examples, without limitation or restriction thereto. It is further understood that the inventors contemplate variations on the parameters and components of the polyurethane molding and coating materials of the molded articles described herein, and uses thereof, within the scope of the present invention and that described in the related Japanese Patent Application No. 07-193815, filed Jul. 28, 1995, the disclosure of which is hereby incorporated by reference.

EXAMPLES

Examples 1 and 2 and Comparative Example (1) Preparation of polyurethane coating material for the mold coat layer:

To a commercially available polyurethane coating material for the mold coat layer (MV-0653 manufactured by Dainippon Ink & Chemicals Inc.) for Examples 1 and 2 was added the following antibacterial agent (i) or (ii), respectively, in an amount of 1 part for 100 parts of urethane resin content. In the Comparative Example, the antibacterial agent was not added to the same polyurethane coating material of the mold coat layer.

(i) "Zeomic AW10D" manufactured by Shinanen Zeomic Co., Ltd. (An antibacterial agent comprising a zeolite on which silver ion was supported).

(ii) "Ceracoat C-11" manufactured by Shinto V Ceramics Co., Ltd. (An antibacterial agent comprising an apatite ceramic on which silver ion was supported).

(2) Formation of the mold coat layer:

The polyurethane coating material for the mold coat layer obtained above was coated on the surface of a mold cavity for product at a dry thickness of 5–20 –m by a spray gun. Then, a core bar was set in the molds and the molds were closed. Subsequently, the pressure in the cavity formed by the closing of molds was reduced to 50 Torr, and RIM was carried out under the following conditions using a flexible urethane foam molding material having the following composition.

(3) Composition of the flexible urethane foam molding material:

| | |
|---|---|
| Polyether polyol (average molecular weight 5000) | 100 parts |
| Glycol crosslinking agent | 18 parts |
| Catalyst | 2 parts |
| Pigment | 6 parts |
| 4,4'-Diphenylmethane diisocyanate (MDI) prepolymer | 65 parts |

(4) Conditions of RIM:

| | |
|---|---|
| Temperature of the polyol component (a mixture of the above-mentioned polyetherpolyol, glycol crosslinking agent, catalyst and pigment) | 45° C. |
| Temperature of isocyanate component | 28° C. |
| Injection speed of urethane foam molding material | 140 g/sec |
| Injection pressure of urethane foam molding material (for both the polyol component and the isocyanate component) | 100 kgf/cm$^2$ |
| Injection time of urethane foam molding material | 3.5 seconds |
| Mold temperature | 55° C. |

Example 3

To the flexible urethane foam molding material used in the above Examples 1 and 2 was added the above antibacterial agent (i) in an amount of 1 part for 100 parts of urethane (foam material) and RIM was carried out under the same molding conditions as above without providing the mold coat.

Example 4 (Antibacterial test)

The surface of a test piece (a square of 50 mm per side) cut out from the steering wheel of each the above Examples 1–3 and the Comparative Example after it was released was disinfected with alcohol. Thereon was dropped 0.5 ml of solution of *Escherichia coli* and *Staphylococcus aureus*, and the bacteria were cultured at 35° C. for 6 hours and 24 hours. Thereafter, the bacteria were washed out from the surface of each of the test pieces with a sterilized phosphoric acid buffer solution. The number of surviving bacteria in the test solution used for washing the surface of each of the est pieces was measured by pour plate method using a medium for measurement of the number of bacteria.

The test results are shown in Table 1. It can be seen from the results that the samples of the test pieces from the molded articles in the Examples of the present invention show excellent antibacterial action, as compared to the test piece from the molded article according to the Comparative Example without any antibacterial agents present within.

TABLE 1

Antibacterial effect
(the number of surviving bacteria)

| | | Comparative Example | Example 1 | Example 2 | Example 3 |
|---|---|---|---|---|---|
| *Escherichia coli* | After 6 hr | $5.5 \times 10^4$ | Undetected | Undetected | Undetected |
| | After 24 hr | $6.5 \times 10^4$ | Undetected | Undetected | Undetected |
| *Staphylococcus aureus* | After 6 hr | $2.4 \times 10^5$ | $2.2 \times 10^3$ | Undetected | Undetected |
| | After 24 hr | $3.6 \times 10^5$ | Undetected | Undetected | Undetected |

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. An integral-skin foam molded article which comprises:
   a main body comprising at least one flexible urethane foam molding material; and
   a coating layer formed on a surface of the main body, said coating layer comprising at least one polyurethane material and containing one or more of an inorganic or organic antibacterial agent.

2. An integral-skin foam molded article according to claim 1, wherein the flexible urethane foam molding material contains one or more of an inorganic or organic antibacterial agent.

3. An integral-skin foam molded article according to claim 2, wherein the main body of the molded article comprises a core layer of low density and a skin layer of high density.

4. An integral-skin foam molded article according to claim 1, wherein the main body of the molded article comprises a core layer of low density and a skin layer of high density.

5. An integral-skin foam molded article according to claim 1, wherein the polyurethane material of the coating layer comprises an isocyanate prepolymer obtained by a chain extension of a polyisocyanate with a polyol.

6. An integral-skin foam molded article according to claim 1, wherein the polyurethane material of the coating layer comprises a polyol component and a polyisocyanate component.

7. An integral-skin foam molded article according to claim 1, wherein the flexible urethane foam molding material comprises a mixture of a polyol component and an isocyanate component which contains substantially no foaming agent and which is limited in water content of the polyol component to less than about 0.4% by weight.

8. An integral-skin foam molded article according to claim 6, wherein the polyol component comprises a polyol and at least one member selected from the group consisting of a crosslinking agent, a catalyst, and a pigment.

9. An integral-skin foam molded article according to claim 7, wherein the polyol component comprises a polyol and at least one member selected from the group consisting of a crosslinking agent, a catalyst, and a pigment.

10. An integral-skin foam molded article according to claim 1, wherein the one or more inorganic antibacterial agent is a silver-supporting inorganic material selected from the group consisting of zeolite, apatite, montmorillonite and zirconium phosphate.

11. An integral-skin foam molded article according to claim 2, wherein the one or more inorganic antibacterial agent of the flexible urethane foam molding material is a silver-supporting inorganic material selected from the group consisting of zeolite, apatite, montmorillonite and zirconium phosphate.

12. An integral-skin foam molded article according to claim 1, wherein the one or more organic antibacterial agent is selected from the group consisting of benzimidazole antibacterial agents and 10, 10'-oxybisphenoxarsine.

13. An integral-skin foam molded article according to claim 2, wherein the one or more organic antibacterial agent of the flexible urethane foam molding material is selected from the group consisting of benzimidazole antibacterial agents and 10, 10'-oxybisphenoxarsine.

14. An integral-skin foam molded article according to claim 1, wherein the one or more inorganic or organic antibacterial agent is added in an amount of about 0.1 to about 10 parts for 100 parts of the polyurethane material of the coating layer.

15. An integral-skin foam molded article according to claim 2, wherein the one or more inorganic or organic antibacterial agent of the flexible urethane foam molding material is added in an amount of about 0.1 to about 10 parts for 100 parts of the flexible urethane foam molding material.

16. A process for producing an integral-skin foam molded article with antibacterial effect, comprising the steps of:
   (a) applying a urethane coating material containing one or more of an antibacterial agent on a surface of a cavity for product comprising a pair of split molds to form a mold coat layer;
   (b) drying the mold coat layer;
   (c) closing the pair of split molds to form the cavity for product;
   (d) reducing the cavity for product to a pressure of not more than about 50 Torr;
   (e) introducing a flexible urethane foam molding material into the cavity for product;
   (f) foaming and hardening the flexible urethane molding material to form a main body;
   (g) integrating an outer surface of the main body with an inner surface of the mold coat layer to form the integral skin foam molded article.

17. A process for producing an integral-skin foam molded article with antibacterial effect according to claim 16, wherein the flexible urethane foam molding material of step (e) contains one or more of an antibacterial agent.

18. A process for producing an integral-skin foam molded article with antibacterial effect according to claim 16, wherein the step (e) comprises introducing a flexible urethane foam molding material into the cavity for product by reaction injection molding.

* * * * *